A. PFENINGER.
TONGS OR CARRIER FOR VESSELS OF THE CUSPIDOR TYPE.
APPLICATION FILED JAN. 29, 1916.
1,190,581. Patented July 11, 1916.
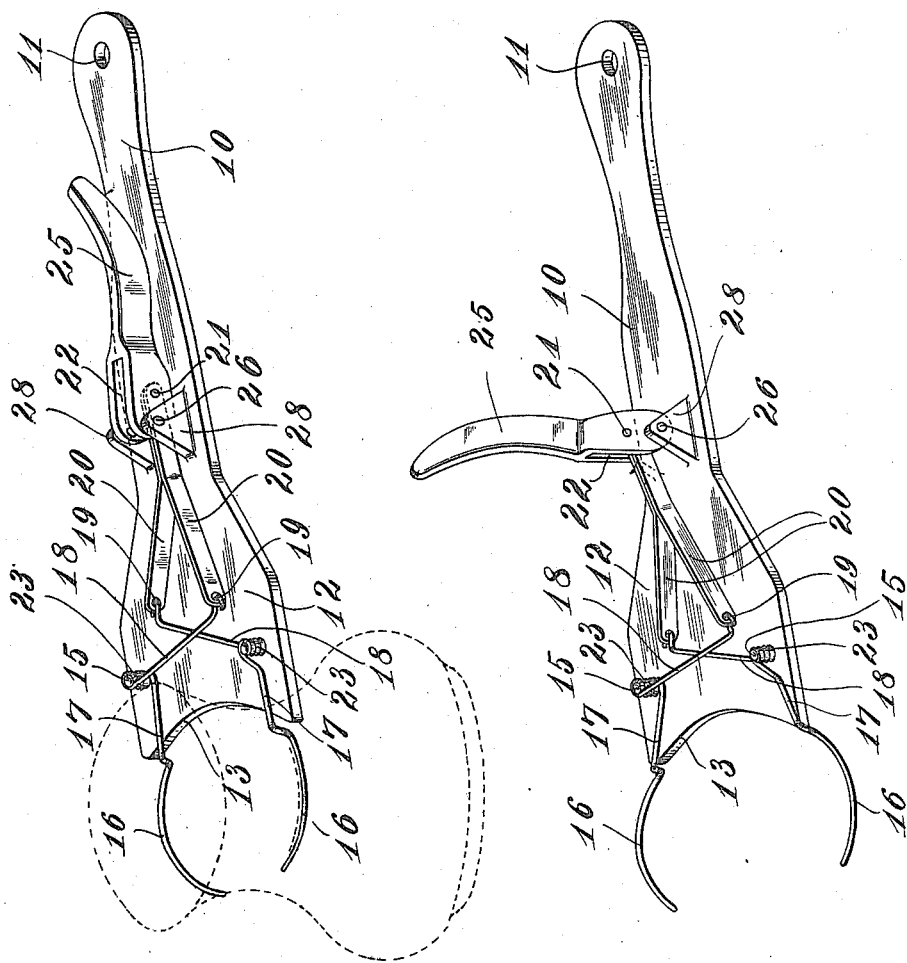
Witnesses:
Richard Wegener.
Ella Ramlow
Inventor
Albert Pfeninger
By his Attorney
Oscar Geier

UNITED STATES PATENT OFFICE.

ALBERT PFENINGER, OF UTICA, NEW YORK.

TONGS OR CARRIER FOR VESSELS OF THE CUSPIDOR TYPE.

1,190,581.        Specification of Letters Patent.        Patented July 11, 1916.

Application filed January 29, 1916. Serial No. 74,990.

*To all whom it may concern:*

Be it known that I, ALBERT PFENINGER, a citizen of the United States, and a resident of Utica, in the county of Oneida and State of New York, have invented certain new and useful Improvements in Tongs or Carriers for Vessels of the Cuspidor Type, of which the following is a specification.

This invention relates to improvements in tongs or carriers for vessels of the cuspidor type and particularly such as can be grasped about the smaller middle portion or neck.

One of the objects is to provide a carrying device having resilient contacting arms not readily liable to break the article grasped.

Another object is to provide an operating lever for the arms, the lever being so mounted as to act as locking means when the arms are engaged with an article, and finally, to provide a strong durable, yet light device of inexpensive construction capable of being operated without previous experience.

These and other objects are attained by the novel construction and combination of parts hereinafter described and shown in the accompanying drawings, forming a material part of this specification, and in which:—

Figure 1 is a perspective view of the device, the arms being in a contracted position, and Fig. 2 is a similar perspective view showing the arms opened widely out.

The device consists of a main handle element 10 which may have holes 11 at its curved upper end by which it may be hung from any convenient projection when not in use. The handle is extended downward, broadened at its lower or base end, which is curved so as to present a concave outline or edge 13 adapted to make contact with the exterior of the article grasped. Mounted on one side of the widened portion 12 is a pair of pins 15, preferably upset at their extreme outer ends, and rigidly secured in the plate. Arms 16, made preferably of resilient material arcuate in their shape, are attached by integrally formed connections 17, and bent so that the arms 16 lie substantially in the plane of the handle element 12; the connections 18 are coiled to surround the pins 15, the coils 23 acting as springs and having their continuing members bent inwardly and formed with terminal hooks 19 adapted to be received in appropriate openings formed within the ends of the links 20, which are pivoted at 21, within the slot 22 of the lever 25, the lever being fulcrumed at 26 in lugs 28 rigidly secured to the plate 10.

It will be noticed that the pivot 21 is at some distance beyond the pivotal point 26 of the lever so that when the lever 25 is in the position shown in Fig. 1, the links will be drawn upward or away from the arms 16, by reason of which they are caused to approach each other and grasp whatever article may be placed between them. At the same time it is also noticeable that the pivot point 21 will be below the pivotal point 26 of the lever, so that a tensional effect is produced, tending to hold the lever 25 tightly against the surface of the handle element 10.

In Fig. 2 the lever is shown in a raised position, the bent links 20 being moved forward, causing the coil 23 to turn upon the pin 15 in the manner of a hinge, but at the same time giving a tensional effect to the arms 16 in addition to their normal resiliency.

From the foregoing it will be seen that a holder is provided which will effectively engage with an article having a diameter compatible with the curvature of the arms and in such manner that the same may be raised or transported as may be desired. Also that when the handle 25 is in a downward position the arms cannot open, except such a small amount as may be due to their resiliency.

Having thus described my invention what I claim as new and desire to secure by Letters Patent, is:—

1. In a device of the class described, the combination with a rigid handle, of a pair of resilient arms pivotally engaged therewith, coiled spring elements combined with said arms at the pivotal point thereof, extensions from said springs transversely disposed on said plate, a slotted lever fulcrumed on said plate and links connecting said extensions with said lever at a point beyond its pivotal support.

2. In a device of the class described, the combination with a handle element, having a concave engaging surface, a pair of resilient arms bent to lie in the plane of said handle, spring coils formed with each of said arms, pivots passing through said spring coils fixed in said handle, extensions from said coils crossing transversely, a lever pivoted on said handle, links connecting between said lever and said extensions, and
5 means combined with said lever for locking said arms when in a closed position.

Signed at New York, in the county of New York and State of New York, this 8th day of January A. D. 1916.

ALBERT PFENINGER.

Witnesses:
FRANCIS NEKARDA,
O. P. GEIER.

Copies of this patent may be obtained for five cents each, by addressing the "Commissioner of Patents, Washington, D. C."